United States Patent [19]

Mendolia

[11] 4,135,552

[45] Jan. 23, 1979

[54] PRESSURIZER HEATERS

[75] Inventor: Frank J. Mendolia, Valrico, Fla.

[73] Assignee: Westinghouse Electric Corp., Pittsburgh, Pa.

[21] Appl. No.: 772,886

[22] Filed: Feb. 28, 1977

Related U.S. Application Data

[63] Continuation of Ser. No. 624,350.

[51] Int. Cl.² .............................................. F16L 55/04
[52] U.S. Cl. ................................. 138/30; 165/107 D; 176/65; 219/316; 219/318; 219/336; 219/523; 285/158
[58] Field of Search ................. 165/107, 142; 176/65; 138/30; 219/312, 314, 306, 316, 318, 336, 523, 536; 285/158

[56] References Cited

U.S. PATENT DOCUMENTS

| 2,936,159 | 5/1960 | Boni, Jr. ................... 165/142 |
| 3,114,414 | 12/1963 | Judd ...................... 165/107 X |
| 3,164,174 | 1/1965 | Berthod et al. ............ 165/107 X |
| 3,212,565 | 10/1965 | Esleeck .................... 165/107 X |
| 3,245,463 | 4/1966 | Benedict et al. ............ 165/107 |
| 3,305,002 | 2/1967 | Leonard, Jr. et al. ....... 165/107 X |

Primary Examiner—Albert W. Davis, Jr.
Attorney, Agent, or Firm—F. J. Baehr, Jr.

[57] ABSTRACT

A pressurizer for a pressurized water nuclear reactor power plant having a plurality of straight immersion heaters with pointed ends.

5 Claims, 2 Drawing Figures

PRESSURIZER HEATERS

This is a continuation of application Ser. No. 624,350, filed Oct. 21, 1975, now abandoned.

BACKGROUND OF THE INVENTION

This invention relates to pressurizers for pressurized water reactor nuclear power systems and more particularly to those which incorporate straight tube immersion heating elements.

The demand for electrical power in the United States doubles approximately every ten years; presently fossil fuels provide the heat energy for producing the bulk of the needed electrical energy. However, in the next thirty years, it is estimated that over 50% of our electrical energy will be produced by nuclear means. Therefore, it is necessary to continually improve the nuclear power generating equipment so that it is easier to maintain and so that exposure to radioactivity by individuals performing maintenance on the equipment is reduced to a minimum.

SUMMARY OF THE INVENTION

In general, a pressurizer vessel for a pressurized water reactor system, when made in accordance with this invention, comprises a cylindrical shell, an upper and lower head attached to the shell, a combination fluid inlet and outlet nozzle in fluid communication with the pressurized water reactor system, a spray nozzle disposed in the upper portion of the vessel and connected to a supply of relatively cool fluid and a plurality of straight tubular electrical heating elements having pointed ends and connected to an electrical supply. The pressurizer also comprises a plurality of support plates disposed in the vessel so as to support the heating elements. The support plates have a plurality of openings for receiving the heating elements and the vessel has a plurality of openings, which are aligned with the openings in the support plates. Seals are formed between the openings in the vessel and the heating elements. The pressurizer is operable so that the pressure in the pressurized water reactor system can be increased by energizing the heaters and decreased by utilizing the spray to condense steam in the pressurizer.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
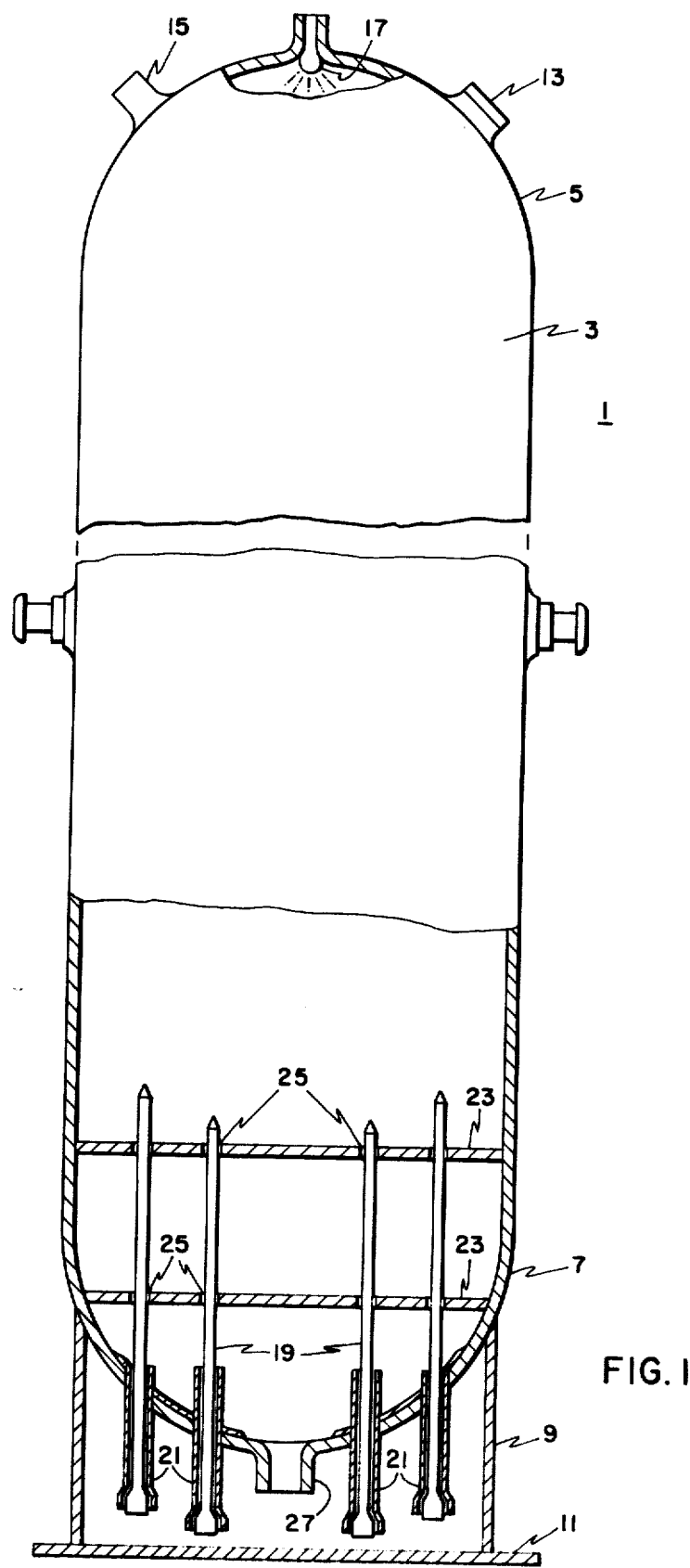
FIG. 1 is an elevational view, partially in section showing a pressurizer made in accordance with this invention.

Referring now to the drawings, FIG. 1 shows a pressurizer 1 for a pressurized water reactor nuclear power plant system. The pressurizer 1 comprises a vessel having a vertically oriented cylindrical shell portion 3, a first or upper hemispherical head portion 5 and a second or lower hemispherical head portion 17. A cylindrical skirt 9 extends downwardly from the lower head portion 7 and has a flange 11 fastened thereto by welding or other means to form a support structure for the vessel.

The upper head portion 5 has a manway 13, one or more nozzles 15 in fluid communication with safety valves (not shown) and a spray nozzle 17 disposed therein. The spray nozzle 17 is in fluid communication with a supply of relatively cool fluid and has means cooperatively associated therewith (not shown), which controls the flow of the relatively cool fluid to the pressurizer.

A plurality of straight tubular electrical immersion heating elements 19 are vertically disposed in the lower head portion of the vessel. The lower head 7 has a plurality of nozzles 21, which have an enlarged end and which receive the heating elements 19. A seal is formed between the tubular heating elements 19 and the nozzles 21 by welding or other sealing means.

To support the heating elements 19 a plurality of support plates 23 are disposed transversely in the lower portion of the vessel. The support sheets 23 have a plurality of holes 25, which receive the heating elements 19. The holes 25 in adjacent support sheets are aligned with the nozzles 21.

A combined inlet and outlet nozzle 27 is centrally disposed in lower head 7 and places the pressurizer 1 in fluid communication with the primary fluid of the pressurized water nuclear reactor power plant system.

Figure 2:
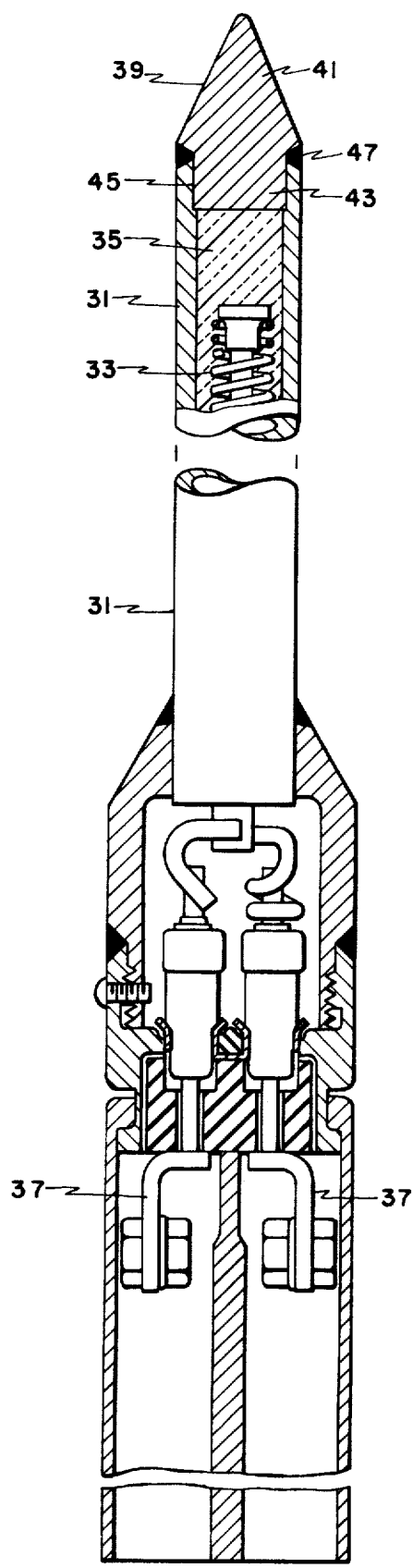
FIG. 2 is a partial sectional view of a heating element for the pressurizer.

As shown in FIG. 2, the tubular immersion heating elements 19 have a tubular metallic sheath 31 and a resistance heating coil 33 disposed within the sheath and separated therefrom by a dielectrically insulating material 35.

Two electrical leads 37 are brought out at one end, the back end, of the heating element 19. As shown in FIG. 2, the back end of the heating element has heavy walls and is expanded outwardly forming a bulbous end. The leads 37 are electrically connected to an electrical supply (not shown), which when energized results in the coils becoming resistantly heated. Another end of the heating element 19, the front or nose end, has a pointed nose portion 39. The nose portion 39 comprises a conical portion 41 having a base diameter generally equal to the outer diameter of the sheath 31 and a cylindrical portion 43 smaller in diameter than the base of the conical portion 41. The sheath 31 has a counter-bore 45, which received the cylindrical portion 43 of the nose portion 39. A seal weld 47 is provided between the sheath and the base of the conical portion 41.

The pointed nose portion 39 advantageously allows the heaters to be replaced, when they burn out, without having someone inside the vessel, which is slightly radioactive, even though the openings 25 in the support plates 19 and the nozzles 21 are slightly misaligned, thus reducing the amount of radiation to which maintenance people are subjected during the replacement procedure.

The operation of the pressurizer 1 is as follows; normally the pressurizer is partially filled with primary fluid or water, the remainder of the vessel is filled with steam; the combined inlet and outlet nozzle 27 is in fluid communication with the primary fluid in the pressurized water reactor system; and to increase the pressure of the primary fluid the heating elements 19 are energized thereby causing the water to boil and increase the amount of vapor in the pressurizer to increase the pressure in the primary fluid system; to reduce the pressure of the primary fluid, relatively cold primary fluid is sprayed through the spray nozzle 17 in the upper portion of the pressurizer 1 condensing some of the steam and thereby reducing the pressure within the pressurizer and in the primary fluid system.

The pressurizer 1, hereinbefore described, advantageously allows the replacement of heating elements without maintenance personnel entering the radioactive vessel minimizing their exposure to radioactivity and reducing the time necessary to replace heating elements, which burn out from time-to-time in normal operation of a pressurized water nuclear power plant.

What is claimed is:

1. A pressurizer vessel for pressurized water nuclear reactor system comprising in combination: a vertically oriented cylindrical shell portion; upper and lower head portions attached to said shell portion; a combined fluid inlet and outlet nozzle disposed in said lower head portion in fluid communication with the pressurized water reactor system; a spray nozzle disposed in said upper head portion and connected to a supply of relatively cool fluid; a plurality of straight tubular electrical heating elements, each of said heating elements having pointed ends and a bulbous end with a heavy wall and electrical leads that connect to an electrical supply; a plurality of support plates disposed in said vessel so as to support said heating elements, said support plates having a plurality of openings for receiving said heating elements; a plurality of heater element nozzles disposed in said lower head portion of said vessel for receiving said heating elements, said heating element nozzles having an enlarged end for receiving said bulbous end of said heating elements; and sealing means disposed to form a seal between said enlarged end of said heater element nozzles and said bulbous end of said heating elements, said heater element nozzles being generally disposed parallel to said fluid inlet and outlet nozzle, and said heating elements being so disposed in said heater element nozzles that said heating elements are connected to said electrical supply external to said vessel and individually accessible, whereby the pressure in the pressurizer and the nuclear reactor system can be controlled by energizing the heating elements to increase the pressure within the system and utilizing the spray to reduce the pressure within the system.

2. A pressurizer as set forth in claim 1, wherein the cylindrical shell is vertically oriented and the first head portion is disposed at the upper end thereof and the spray nozzle is disposed in the first head portion.

3. A pressurizer as set forth in claim 2, wherein the cylindrical shell is vertically oriented and the second head portion is disposed at the lower end of the vessel and the openings in the vessel receiving the heating elements are disposed in the second head.

4. A pressurizer as set forth in claim 3, wherein the pointed end of the heating element are generally conically-shaped.

5. A pressure vessel as set forth in claim 4, wherein the straight tube heating elements have a metallic tubular sheath forming an outer portion thereof, one end of which is counter-bored and the pointed end is made up of a conical portion and a cylindrical portion, the cylindrical portion being disposed within the counter-bore and the base of the conical portion being generally the same diameter as the outside diameter of the tubular sheath and being welded thereto.

* * * * *